United States Patent [19]

Brasher

[11] Patent Number: 5,429,403

[45] Date of Patent: Jul. 4, 1995

[54] AUTOMATED PIVOTABLE CARGO BOX EXTENSIONS

[76] Inventor: Andrew J. Brasher, Rte. 1, Box 128D, Wetumka, Okla. 74883

[21] Appl. No.: 54,078

[22] Filed: Apr. 27, 1993

[51] Int. Cl.$^6$ ............................................. B62D 33/08
[52] U.S. Cl. ...................... 296/32; 296/26; 296/10; 296/98
[58] Field of Search ...................... 296/26, 98, 32, 36, 296/10, 27

[56] References Cited

U.S. PATENT DOCUMENTS

| | | |
|---|---|---|
| 3,317,239 | 5/1967 | Tantlinger . |
| 3,861,737 | 1/1975 | Kirkbride . |
| 4,095,838 | 6/1978 | Beeler . |
| 4,206,943 | 6/1980 | Friedenberg . |
| 4,302,044 | 11/1981 | Sims . |
| 4,613,182 | 9/1986 | Stone ............................ 296/10 X |
| 4,703,971 | 11/1987 | Schmeichel et al. . |
| 4,842,317 | 6/1989 | Moore ............................ 296/36 |
| 4,887,860 | 12/1989 | Dowty . |
| 5,056,859 | 10/1991 | Walder ............................ 296/32 X |
| 5,110,021 | 5/1992 | Dawson, Jr. ............................ 296/10 X |

FOREIGN PATENT DOCUMENTS

1237748  6/1988  Canada ................................. 296/98

Primary Examiner—Joseph D. Pape
Attorney, Agent, or Firm—Craig W. Roddy

[57] ABSTRACT

An extension assembly having a pair of extension members which are pivotally mounted atop cargo box sidewalls. The extension members are automatically raised and lowered by pneumatic actuators having extendable and retractable rams. A roller arrangement is coupled with the extension members to vertically move and stabilize a roll-up tarpaulin apparatus and associated end-caps therewith. The roller arrangement moves in uniform cooperation with the pivoting extension members. Further, the extension members are laterally supported in the raised position by a plurality of horizontally spaced-apart supports which are pivotally connected to the extension members. The supports are pivotally connected to sliding collars mounted around trusses which laterally transverse the cargo box. During the raising operation, the sliding collars contact stoppers affixed to the trusses whereby the extension members are securely held in a vertically raised position. Thus, lateral support and pivotal motion of the extension members are firmly established upon the cargo box's lateral support structure.

20 Claims, 10 Drawing Sheets

AUTOMATED PIVOTABLE CARGO BOX EXTENSIONS

BACKGROUND

The present invention relates generally to an extension assembly, and more specifically, to an automated pivotal extension assembly for attachment to an open-top cargo box.

Extension apparatus for trucks or the like which increase the volume or height of the cargo area of such load carrying vehicles are known in the prior art. The body of prior art is comprised primarily of truck trailers utilizing vertically adjusting roof or sidewall assemblies. However, many of these apparatus lack sufficient strength, support and stability to ensure the safe containment and transit of loaded commodities. Furthermore, permanently attached and adjustable cargo box extensions of the kind found in the prior art generally require manual activation to complete the raising and lowering thereof. This requires much time and effort and often necessitates the operator to enter into the cargo box area.

An example of such an extension assembly can be found in U.S. Pat. No. 4,703,971 issued to Schmeichel et. al., on Nov. 3, 1987. The Schmeichel extension assembly includes a frame having an upper frame component and a lower frame component interconnected by a flexible fabric. The fabric becomes taut when the upper frame component is manually raised and reduces to a slack condition inside the cargo box area when the frame component is lowered.

The upper frame component is vertically supported by a plurality of horizontally spaced-apart jacks. Each jack must be separately activated in two stages by the operator during every lowering and raising process. Although aided by gas spring actuators attached to the ends of the upper and lower frames, the operator must enter inside the cargo box area to manually unpin and lift the upper frame component into its raised position. In addition, a heavy rolled-up tarpaulin cover must be simultaneously lifted with the upper frame component. This task requires great time, effort and agility from the operator. In addition, many open-top cargo box vehicles have sloped hopper floors which make raising and lowering movements especially difficult and hazardous.

Hence, there is a need for a simple, economical and effective automated pivotal extension assembly for attachment to an open-top cargo box; however, until now, no such assembly has been developed.

SUMMARY

The preferred embodiment of the invention is directed to an extension assembly and is well suited for attachment to a open-top truck cargo box.

The present version of the invention comprises an extension assembly having a pair of elongated extension members which are pivotally mounted atop cargo box sidewalls. The extension members are automatically raised and lowered by pneumatic actuators having extendable and retractable rams.

A roller arrangement is coupled with the extension members to vertically move and stabilize a roll-up tarpaulin apparatus and associated end-caps therewith. The roller arrangement moves in uniform cooperation with the pivoting extension members. Further, the extension members are laterally supported in the raised position by a plurality of horizontally spaced-apart supports which are pivotally connected to the extension members. Additionally, the supports are pivotally connected to sliding collars mounted around trusses which laterally transverse the cargo box.

During the raising operation, the sliding collars contact stoppers affixed to the trusses whereby the extension members, by means of interconnecting braces, are securely held in a vertically raised position. Thus, lateral support and pivotal motion of the extension members are firmly established upon the cargo box's lateral support structure.

As such, it is a first object of the embodiment of the invention to provide an automated pivotal extension assembly for attachment to a truck cargo box.

It is a further object of the embodiment of the invention to provide an extension assembly comprised of sturdy, rigid extension members for mounting to a cargo box to substantially increase the height thereof.

It is a further object of the embodiment of the invention to provide an extension assembly which will raise and lower by pivoting about horizontal axes extending parallel to the sidewalls of the cargo box.

It is a further object of the embodiment of the invention to provide an extension assembly which is not removed from the cargo box when not in use.

It is a further object of the embodiment of the invention to provide an extension assembly having sufficient bracing to support the additional load contained by the extension members when in the raised position.

It is a further object of the embodiment of the invention to provide an extension assembly which utilizes the cargo box trusses to strengthen the extension assembly support structure.

It is a further object of the embodiment of the invention to provide an extension assembly which is compatible with a roll-up tarpaulin apparatus and which will respectively lift and support the tarpaulin apparatus during assembly, actuation and operation.

It is a further object of the embodiment of the invention to provide an extension assembly which is quickly and automatically raised into its operational position and retracted into its lowered position by means of pneumatic power.

It is a final object of the embodiment of the invention to provide an extension assembly which is pivotally raised to an intermediate operational position by means of pneumatic power.

BRIEF DESCRIPTION OF THE DRAWINGS

These and other features, aspects, and advantages of the present invention will become better understood with regard to the following description, appended claims, and accompanying drawings where:

DESCRIPTION

Reference will now be made in detail to the preferred embodiments of the invention, examples of which are illustrated in the accompanying drawings. While the invention will be described in conjunction with the preferred embodiments, it will be understood that they are not intended to limit the invention to those embodiments. On the contrary, the invention is intended to cover alternatives, modifications, and equivalents, which may be included within the spirit and scope of the invention as defined by the appended claims.

As best illustrated in FIGS. 1-5, the preferred embodiment of the invention relates to an automated pivotal extension assembly 20 which is useful for attachment to a cargo box 22 of a truck, wherein the cargo box 22 includes a pair of longitudinally opposed sidewalls 24, a pair of laterally opposed endwalls 26, a bottom 28 and a generally designated top 30 which is open. The cargo box 22 has a void 32 defined therein which is referred to as the interior thereof, while the perimeter of the cargo box 22 is referred to as the exterior. The sidewalls 24 are generally defined as being in a vertical plane, thus vertical and horizontal orientations referred to herein are generally parallel and perpendicular, respectively, to the sidewalls 24.

Figure 5:
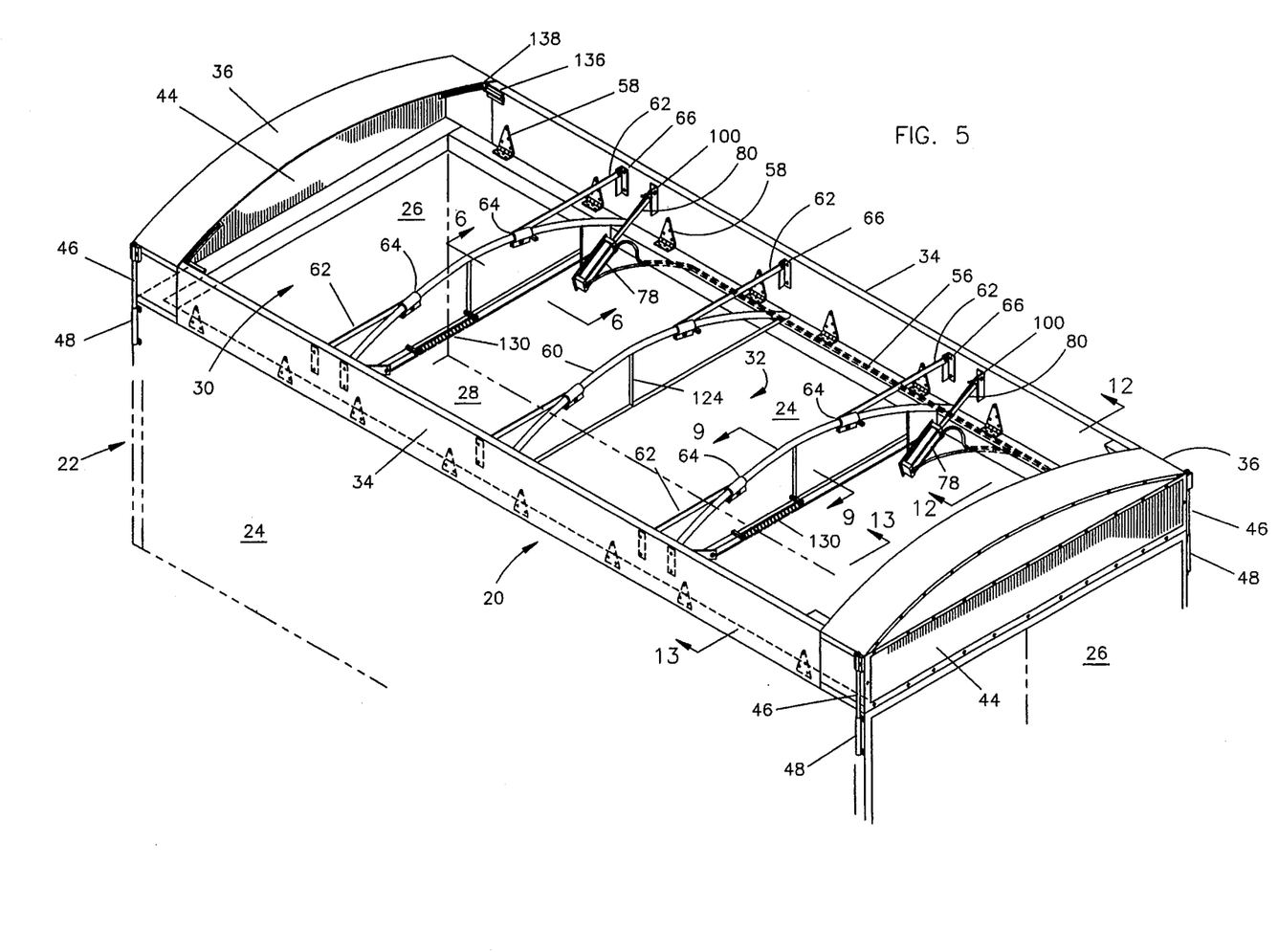
FIG. 5 is an elevated perspective view of the extension assembly in the operationally raised position.

Referring to FIG. 5, a pair of extension members 34, preferably elongated planks made of a rigid material such as aluminum, are pivotally mounted to the sidewalls 24. The extension members 34 are located adjacent the top 30 and are oppositely positioned. When the extension members 34 are lowered they are generally horizontal and extend over a portion of the top 30, see FIG. 1.

The extension members 34 are pivotally raised and lowered about axes extending parallel to the sidewalls 24, wherein the extension members 34 are vertically aligned with the sidewalls 24 when raised and somewhat perpendicular thereto when lowered. Thus, the extension assembly 20 is adjustable between raised and lowered positions, as shown in FIGS. 1-4.

Figures 1, 3:
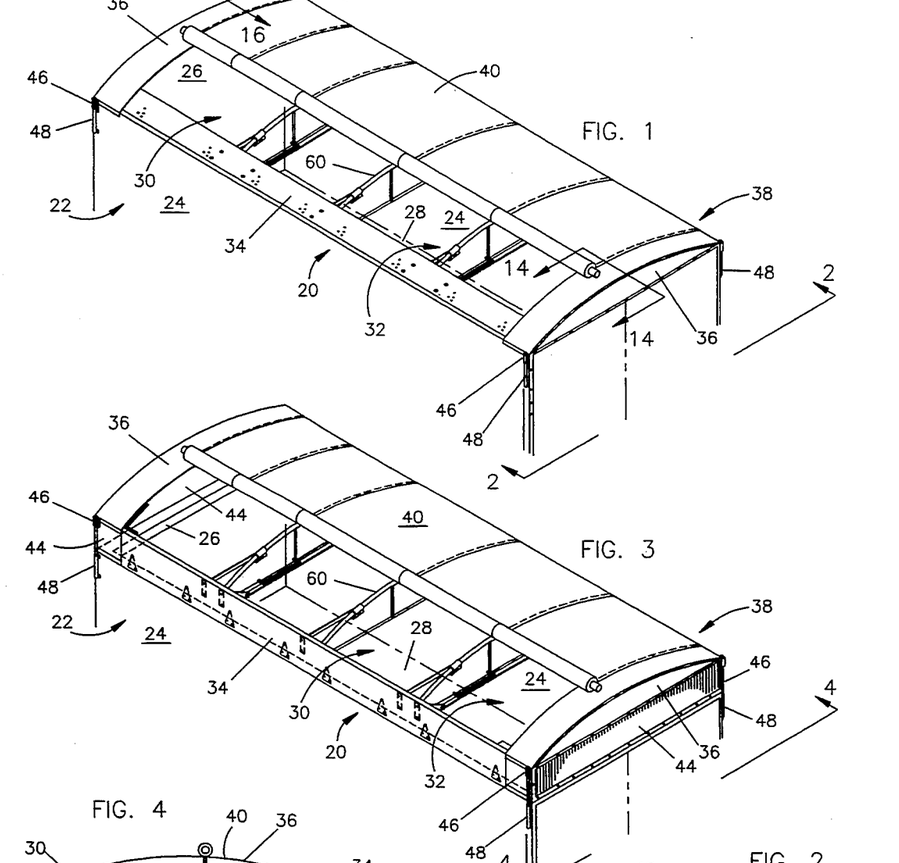
FIG. 1 is an elevated perspective view of the extension assembly in an operationally lowered position atop a cargo box and including a roll-up tarpaulin apparatus.
FIG. 3 is an elevated perspective view of the extension assembly in an operationally raised position atop a cargo box and including a roll-up tarpaulin apparatus.
Figure 2:
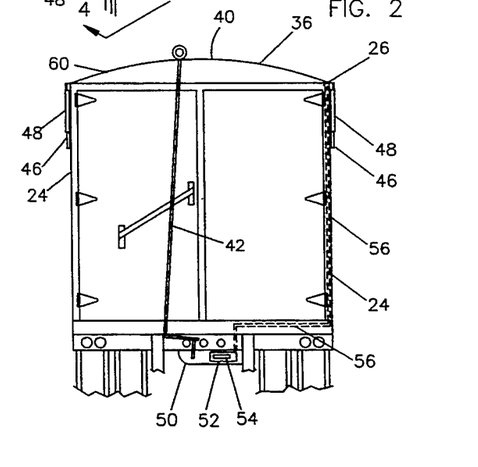
FIG. 2 is an end view of the cargo box taken along line 2—2 of FIG. 1.

As shown in FIGS. 1 and 2, in the lowered position upper-bowed end-caps 36 of a roll-up tarpaulin apparatus 38 rest atop the endwalls 26. A flexible tarpaulin cover 40 is wound laterally between the sidewalls 24 across the top 30 by means of an extended tarp handle 42. The tarpaulin cover 40 laterally winds between the sidewalls 24 into a partially rolled-up tarpaulin cover 40.

A flexible tarpaulin member 44 is jointly attached to a vertical wall of the end-caps 36 and to the sidewalls 24. The tarpaulin member 44 is pulled into taut condition with uniform tension during the use and operation of the extension assembly 20. Guide rods 46 are vertically mounted on the exterior of the end-caps 36 and slide vertically inside corresponding guide sleeves 48 mounted on the exterior of the sidewalls 24.

Figure 4:
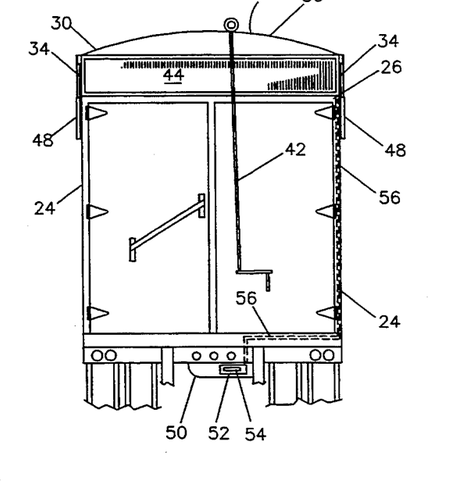
FIG. 4 is an end view of the cargo box taken along line 4—4 in FIG. 3.

In FIGS. 2 and 4, an air reservoir 50 and an air actuator valve 52 are preferably mounted underneath the rear of the cargo box 22. Extending from the actuator valve 52 is an actuator valve handle 54 which controls the flow of air through a pair of air lines 56. The air lines 56 extend vertically along the interior of the cargo box 22 and are preferably secured in a corner thereof. The actuator valve 52 is located to ensure convenient access to an operator, thus any suitable placement of the actuator valve 52 which furthers this purpose is acceptable.

Figure 6:
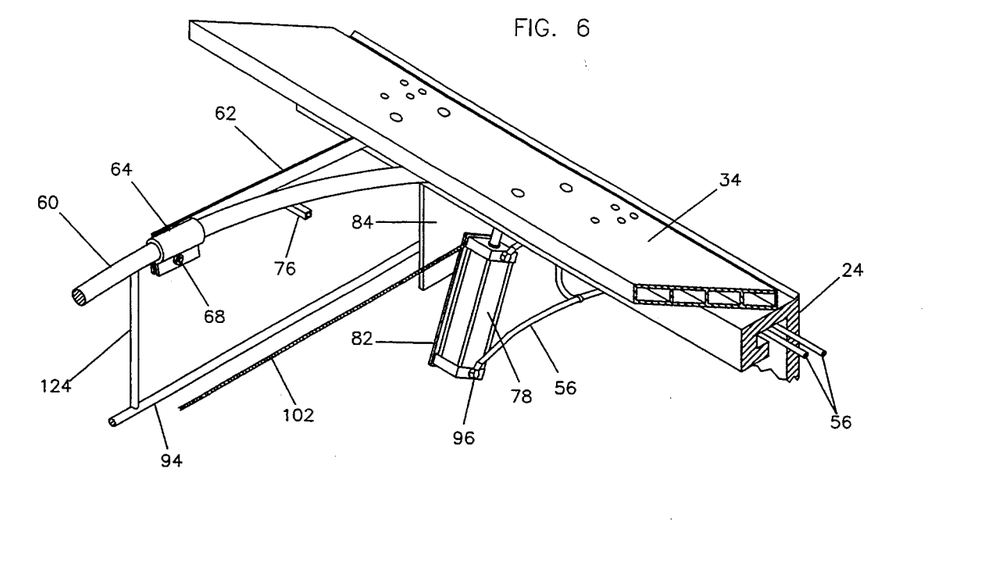
FIG. 6 is a partial perspective view of the extension assembly in its lowered position taken along line 6—6 of FIG. 5.
Figure 7:
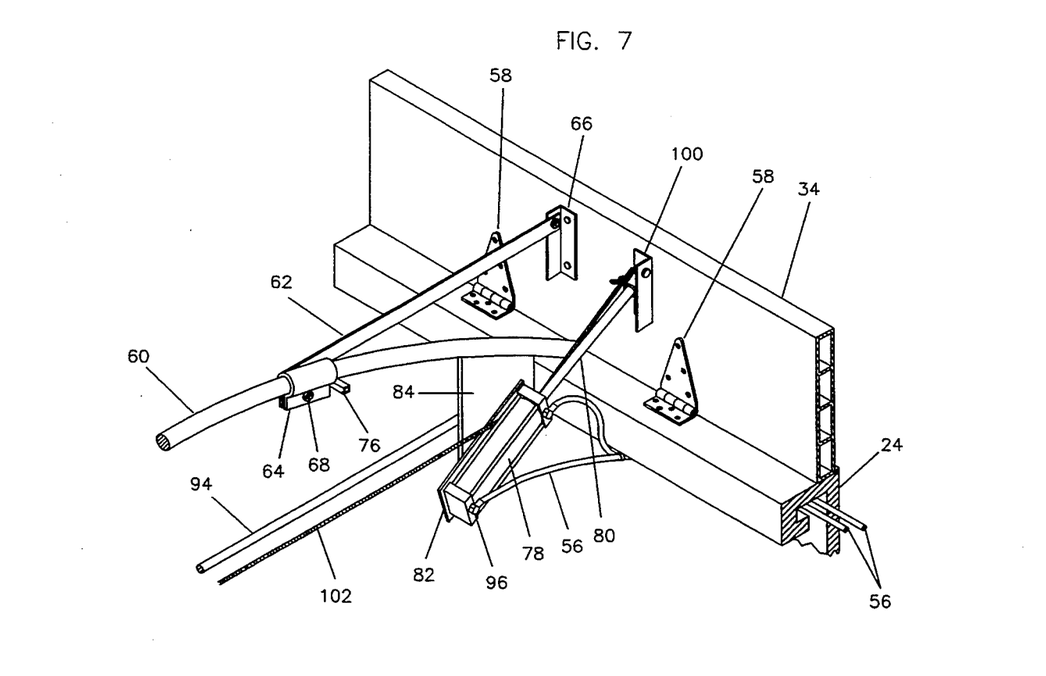
FIG. 7 is the extension assembly of FIG. 6 in its raised position.
Figure 8:
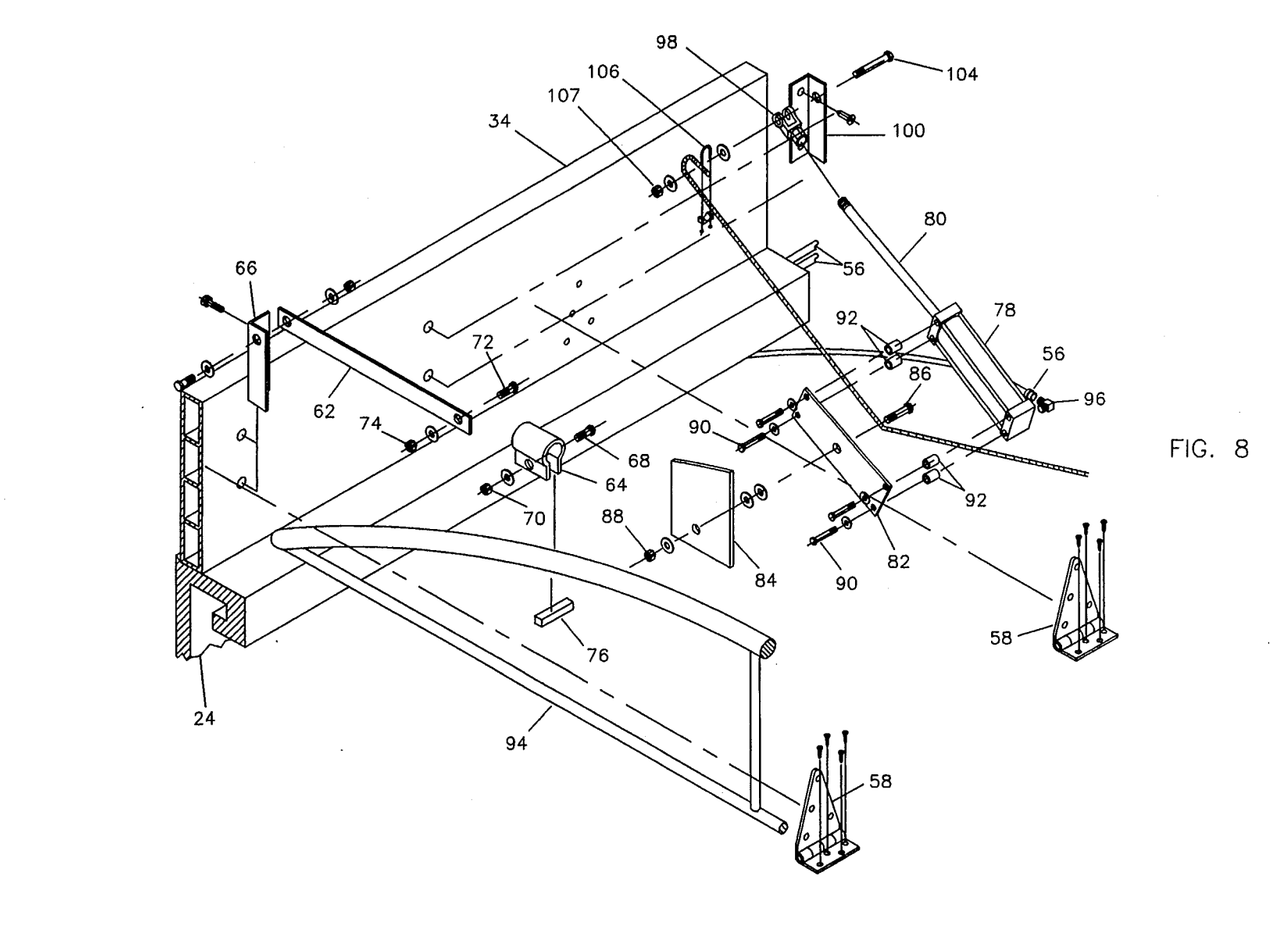
FIG. 8 is an exploded view of the extension assembly of FIG. 7.

As illustrated in FIGS. 6-8, the extension members 34 are pivotally connected to the edge of the sidewalls 24 somewhat near the top 30 by a plurality of horizontally spaced-apart hinges 58. Each hinge 58 is fastened to the sidewall 24 and to the extension member 34, wherein the hinges 58 pivot about the axes extending parallel the sidewalls 24. While in the raised position the extension members 34 adjacently rest against the sidewalls 24, see FIG. 7.

Referring to FIG. 5, somewhat bowed trusses 60 extend and connect between the opposing sidewalls 24. Further, as illustrated in FIGS. 7 and 8, a laterally extended tension support brace 62 is pivotally interconnected between a slidable collar 64 and a brace bracket 66. The brace bracket 66 is attached to the extension member 34 while the collar 64 is positioned around the bowed truss 60.

The collar 64 is substantially circular and has two rectangular fins projecting normal to the lower curved surface of the collar 64. These spaced-apart parallel fins are coupled with a first bolt 68 that extends therethrough. The bolt 68 is adjustably secured with a first self-locking nut 70 to maintain the collar's 64 secure yet unrestricted sliding along the bowed truss 60.

A second bolt 72 is then affixed normal to the circular wall of the collar 64 which faces the support brace 62. The second bolt 72 is attached to the collar 64 by welding or similar fastening means and extends through the support brace 62. Thus, the support brace 62 is secured to the collar 64 with a second self-locking nut 74. The nut 74 is adjusted to eliminate lateral twisting of the support brace 62 while preserving uninhibited pivotal motion about the axis extending parallel the sidewall 24.

Again referring to FIGS. 7 and 8, the support brace 62 extends from the sliding collar 64 to the extension member 34 and is mounted with bolts to the extension member 34. The brace bracket 66 is mounted such that the support brace 62 remains laterally parallel to the bowed truss 60.

A first piece of elongated square tubing 76 is affixed to the bowed truss 60 by welding or other suitable fastening means. The tubing 76 is positioned along the bowed truss 60 between the collar 64 and the extension member 34, preferably at the point of maximum collar 64 travel along the bowed truss toward the extension member 34. Thus, the sliding collar 64 contacts the tubing 76 when the extension member 34 is in the raised position.

The items described above in FIGS. 6-8 are preferably used in plurality as illustrated in FIG. 5 and utilize a plurality of pneumatic actuators 78 each with an extendable ram 80 and mounted to a swivel plate 82. The swivel plate 82 is pivotally connected to a fixed base plate 84 using a third bolt 86 and third self-locking nut 88 while the actuator 78 is attached to the swivel plate 82 by fourth bolts 90 or similar fastening means. Preferably bushings 92 are slid over the bolts 90 and mounted between the actuator 78 and the swivel plate 82, wherein the head of the bolts 90 do not contact the actuator 78 during the pivoting motion.

The base plate 84 is preferably square and shaped along one side thereof to conform with the bottom surface of the bowed truss 60 which is welded thereto. In addition, the base plate 84 is preferably welded to a lower support truss 94 which is generally extends parallel the bowed truss 60. The bolt 86 pivotally interconnects the swivel plate 82 and the base plate 84 through aligned apertures. The aperture in the base plate 84 is located through the lower central portion thereof at a point below the adjoining lower support truss 94.

Figure 12:
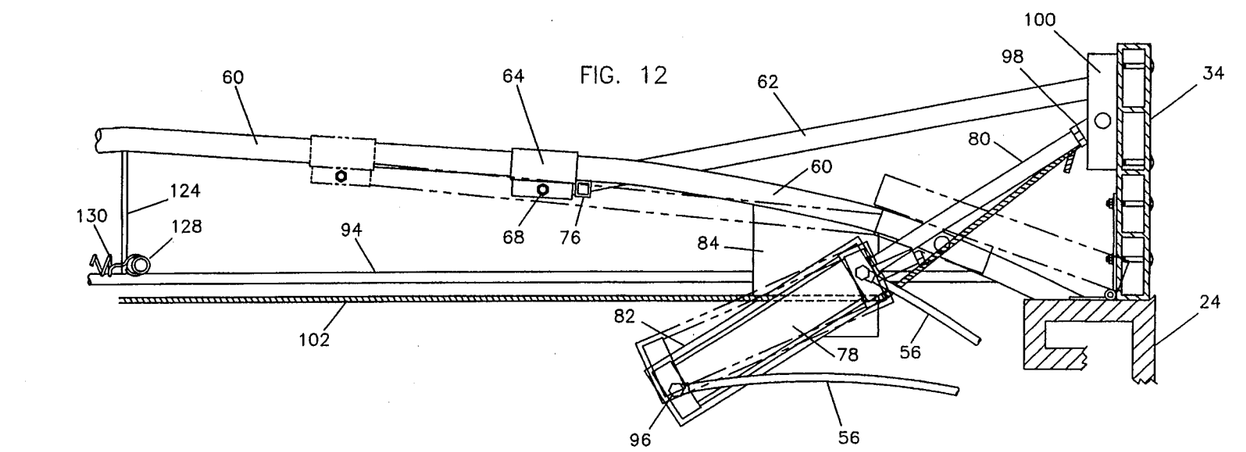
FIG. 12 is a sectional view taken along line 12—12 of FIG. 5.

As shown in FIGS. 6, 7 and 12, the actuators 78 pivot about an axis parallel to the sidewall 24; thus, moving to and fro in relation to the sidewall 24. One air line 56 is connected to each actuator 78 by means of an L-shaped hydraulic fitting 96 which is affixed to the side of each actuator 78 and preferably away from the affixed swivel plate 82.

The air lines 56 extend along the interior portion of the sidewall 24 and are suitably affixed thereto. The air lines 56 are coupled together by a plurality of snap ties and are connected to the actuator valve 52, see FIGS. 2 and 4.

The extendable ram 80 is joined to the extension member 34 using a clevis 98. The clevis 98 is pivotally connected to a ram bracket 100 which is mounted to the interior of the extension member 34. A cable 102 is looped around a fifth bolt 104 which pivotally connects the clevis 98 to the ram bracket 100. The loop formed on the end of the cable 102 is securably closed using a cable clamp 106.

The loop of the pivotally fastened cable 102 is separated from the clevis 98 and a fourth self-locking nut 107 by using washers to prevent binding. As shown in FIG. 8, the cable 102 underlaps the bushing 92 which is proximate to the sidewall 24 and extends through a space between the swivel plate 82 and attached actuator 78. The cable 102 runs parallel to the lower support truss 94 and horizontally transverses the cargo box 22.

Figure 9:
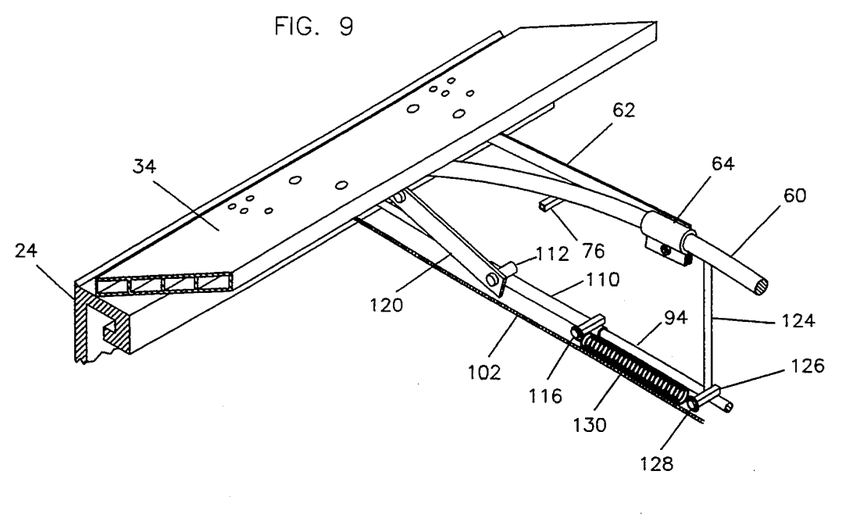
FIG. 9 is a partial view of the extension assembly in its lowered position taken along line 9—9 of FIG. 5.
Figure 10:
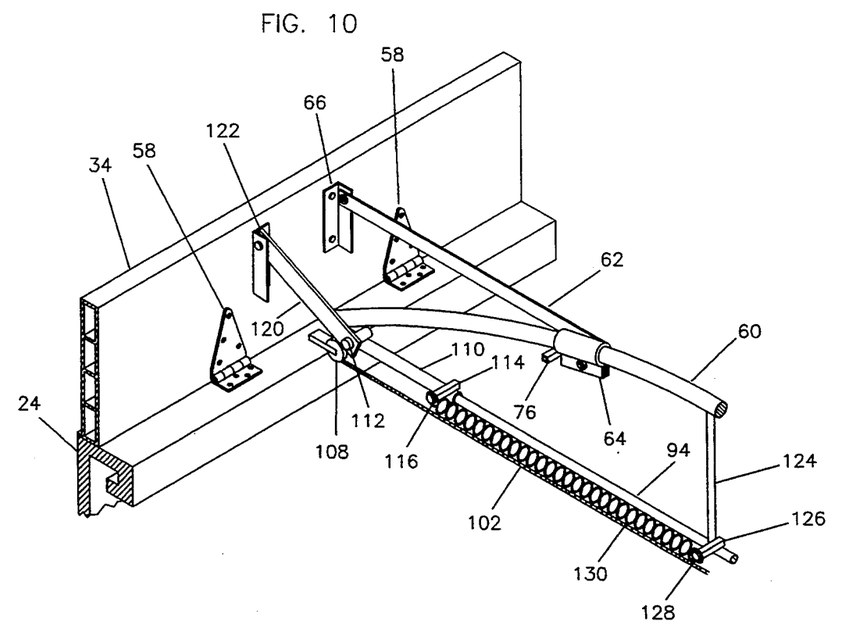
FIG. 10 is the extension assembly of FIG. 9 in the raised position.
Figure 11:
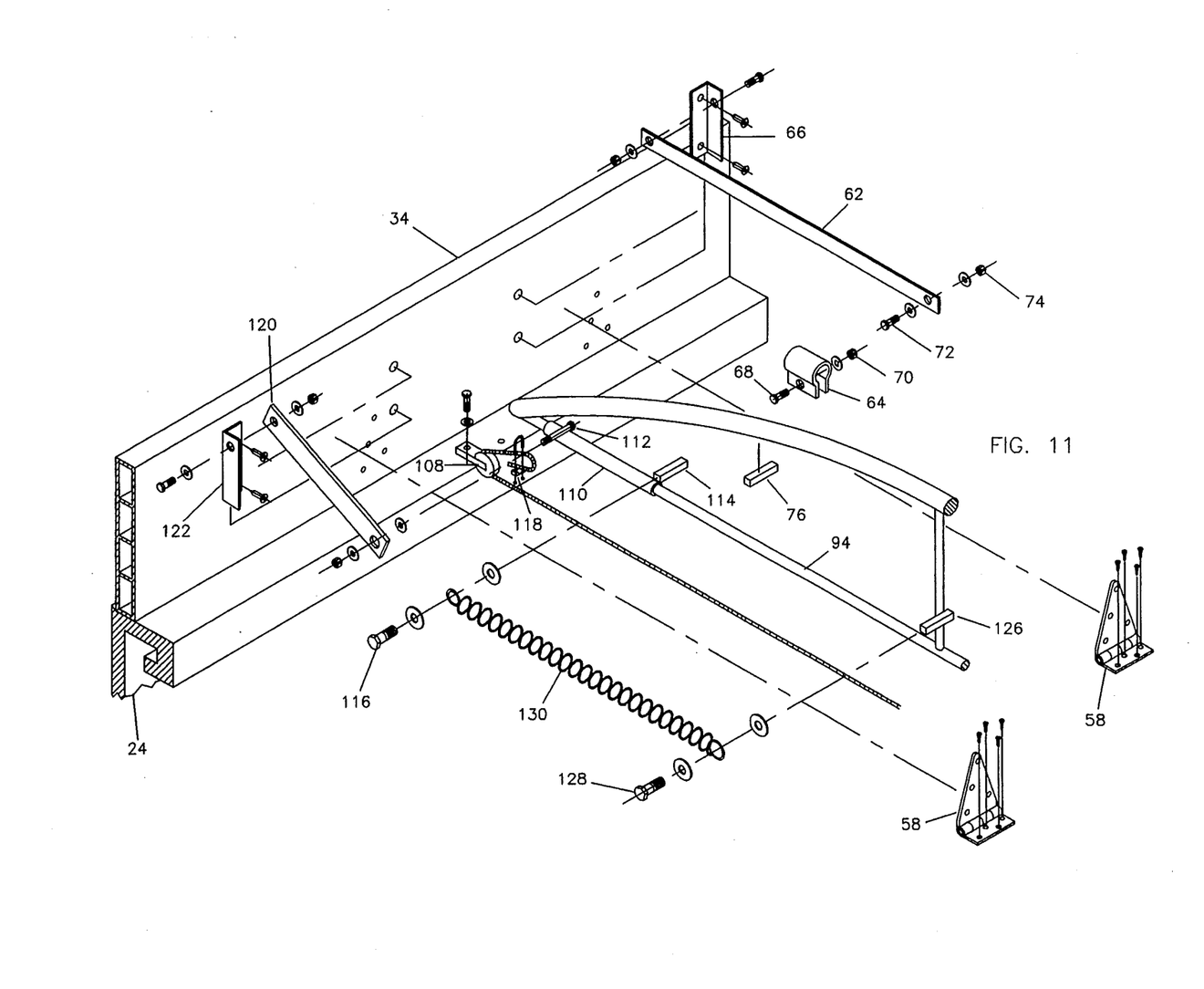
FIG. 11 is an exploded view of the extension assembly of FIG. 10.

As illustrated in FIGS. 9-11, the extension member 34, which is oppositely positioned the extension member 34 described above in conjunction with FIGS. 6-8, is likewise pivotally connected to the opposing sidewall 24 by a plurality of hinges 58. The extension assembly 20 components associated with the extension member 34 shown in FIGS. 9-11, are similar to the elements associated with the extension member of FIGS. 6-8 and include having the flanged collar 64 mounted around the bowed truss 60, the piece of tubing 76, the support brace 62, and the brace bracket 66.

In the preferred embodiment and as shown in FIGS. 9-11, the cable 102 transverses the top 30 of the cargo box 22 between the sidewalls 24. The cable 102 extends parallel to the lower support truss 94. A pulley 108 is mounted to the sidewall 24 located adjacent the top 30 by using a self-tapping bolt. The cable 102 loops around the pulley 108 thereby making a U-shaped bend and reversing the direction of the cable 102 travel.

A push sleeve 110 is slidably mounted around the lower support truss 94. The inner diameter of the push sleeve 110 is suitably larger than the outer diameter of the lower support truss 94 to allow smooth sliding. A sixth bolt 112 extending parallel to the sidewall 24 is attached to the top of the push sleeve 110 end nearest the sidewall 24. A second piece of tubing 114 with a seventh bolt 116 extending therefrom is similarly mounted on the opposite end of the push sleeve 110.

The end of the upper-cable 102 is looped around the bolt 112. The loop is secured using a cable clamp 118. An end of an elongated lifting arm 120 is pivotally connected to the slidable push sleeve 110. The bolt 112 attached to the end of the push sleeve 110 acts as an axis for the pivotal connection of the lifting arm 120. The lifting arm 120 is shorter than the support brace 62 but otherwise of generally similar dimensions.

The lifting arm 120 extends from the push sleeve 110 to an elongated lifting arm bracket 122 vertically mounted to the extension member 34. The lifting arm 120 is pivotally connected to the lifting arm bracket 122 which is fastened to the extension member 34.

The bolt 116 protrudes from the tubing 114 and extend parallel to the sidewall 24. The tubing 114 is attached to an end of the push sleeve 110 located nearest a vertical member 124. The vertical member 124 is vertically connected between the bowed truss 60 and the lower support truss 94.

Similarly, a third piece of tubing 126 with an eighth bolt 128 is mounted on the lower support truss 94 where the vertical member 124 is attached thereto. The tubings 76, 114, 126 are attached to the respective push sleeve 110 and trusses 60, 94 by welding or other suitable fastening means.

A spring 130 is connected between the push sleeve 110 and the vertical member 124, see FIG. 9. Looped ends of the relaxed spring 130 are positioned over the bolts 116, 128. As illustrated in FIG. 10, the spring 130 extends into a high-tension state when the extension member 34 is in the raised position.

Preferably as illustrated in FIG. 5, the present invention has a plurality of cable-linked combinations using the actuator 78 and a lifting arm 120 assembly. Each combination is horizontally spaced-apart along the sidewalls 24 near the top 30. It will be appreciated that any number of such laterally arrayed combinations which are necessary to ensure the proper function of the extension assembly 20 may be present. However, the lateral support arrangement consisting of the collar 64, support brace 62, brace bracket 66, and tubing 76 is preferably positioned at each of the horizontally spaced-apart trusses 60, 94.

As illustrated in FIG. 5, the end-caps 36 extend parallel and adjacent to the endwalls 26. As shown in FIGS. 14-17, the end-caps 36 open toward the interior of the cargo box 22 and are somewhat closed over the top 30 extending between the sidewalls 24 and corners thereof. The end-caps 36 lap over and are proximate the sidewalls 24. Each extension member 34 moves immediately adjacent but does not contact the end-caps 36. Thus, there is no binding between the end-caps 36 and extension members 34 during operation.

As shown in FIGS. 14–17, a lower edge of the tarpaulin member 44 is attached to the sidewall 24 and endwall 26 while an upper edge of the tarpaulin member 44 is attached to the interior portion of the end-caps 36. An elongated lower tarp bracket 132 extends along the upper endwall 26 and atop the opposing sidewall 24 to a point directly underneath the edge of the bowed portion of the end-caps 36.

The horizontal portion of the lower tarp bracket 132 secures the lower edge of the tarpaulin member 44 along the exterior edge of the sidewall 24 by a plurality of self-tapping bolts. Both the vertically projected portion of the lower tarp bracket 132 and the edge of the tarpaulin cover 44 are aligned along the exterior portion of the sidewall 24. An upper tarp bracket 134 is affixed to the section of the end-cap 36 which overlaps the sidewall 24 portion proximate the top 30. The vertical portion of the upper tarp bracket 134 secures the tarpaulin member 44 against the end-caps 36 by carriage bolts.

Figure 14:
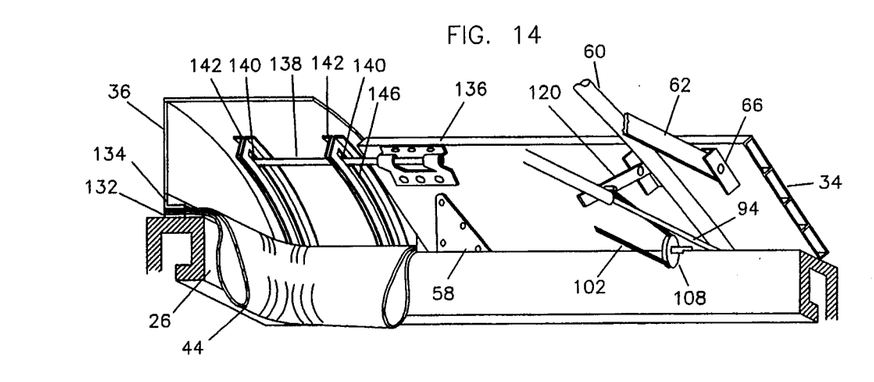
FIG. 14 is a from-below view of the corner of the extension assembly taken along line 14—14 of FIG. 1.
Figures 16, 17:
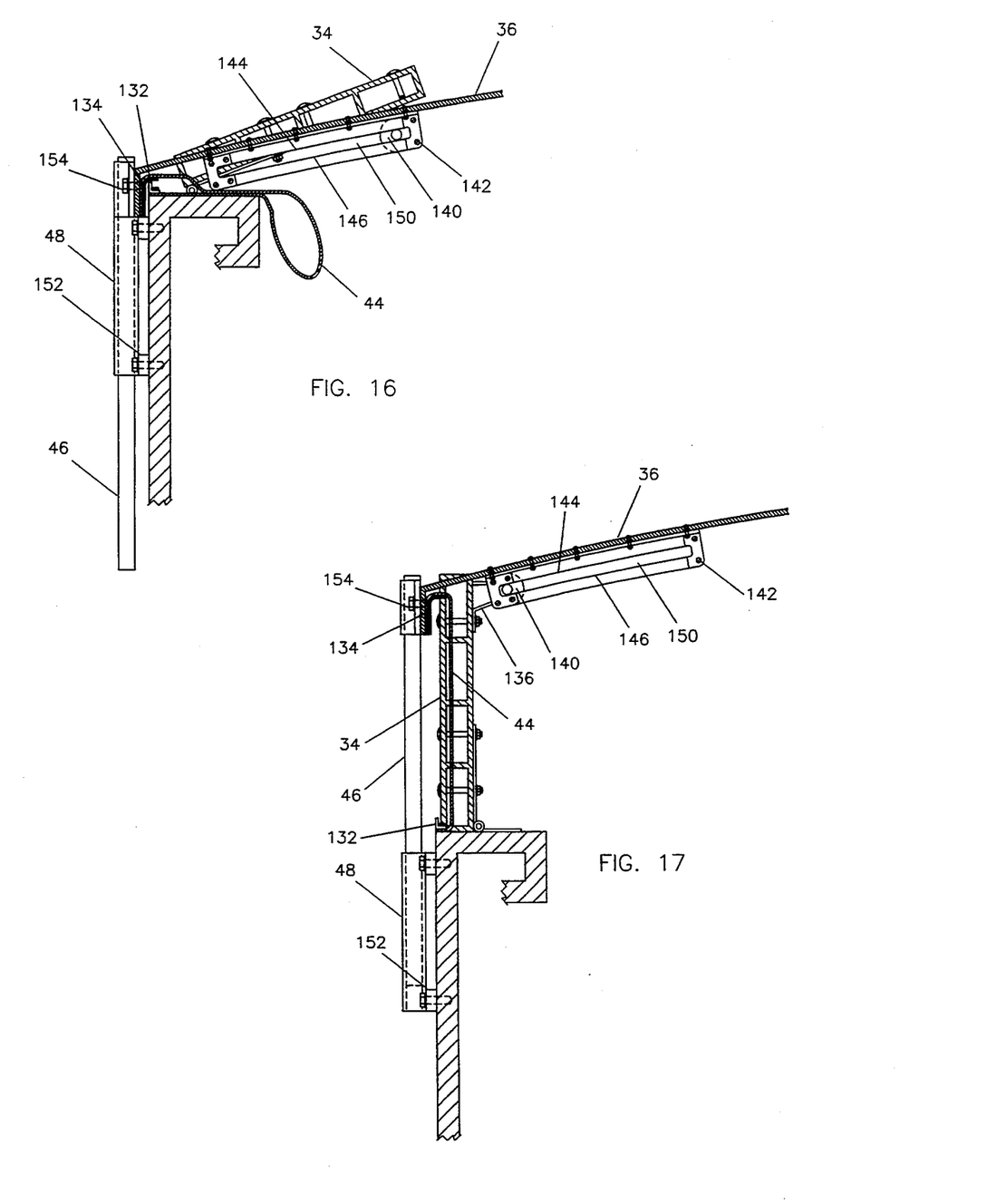
FIG. 16 is a sectional view taken along line 16—16 of FIG. 1.
FIG. 17 is a sectional view of FIG. 16 in the operationally raised position.

As seen in FIG. 14 and 16, the extension assembly 20 resides in the lowered position, and the upper tarp bracket 134 rests against the lower tarp bracket 132. In the lowered position, the tarpaulin member 44 is in a slack condition and folds inward to the interior of the cargo box 22. The exterior sidewall 24 is separated from the overlapping end-caps 36 by the rounded heads of the horizontally extended carriage bolts which connect the upper tarp bracket 134 to the end-caps 36.

An adjustable roller bracket 136 is mounted to the extension member 34. An elongated roller bar 138 is mounted to the roller bracket 136. The roller bar 138, which extends parallel to the sidewall 24 of the cargo box 22 and beyond the end of the extension member 34 towards the interior vertical wall of the end-cap 36, serves as a rotational axis for a pair of wheels 140.

As seen in FIGS. 14–17, the wheels 140 are horizontally spaced-apart and roll within two tracks 142. The horizontal portions of the tracks 142 are mounted to the underside of the bowed portion of the end-caps 36. The tracks 142 are fixably spaced-apart to allow free wheel 140 rotation therein.

Each track 142 consists of upper and lower channels 144, 146. The upper and lower channels 144, 146 are elongated and extend vertically and laterally parallel to the end-cap 36. The upper channel 144 opens toward the lower channel 146 and is oppositely position with respect thereto. The upper and lower channels 144, 146 are connected at their ends. Thus, the upper and lower channels 144,146 are spaced-apart to create an elongated slot 150. The slot 150 is of sufficient width to allow the roller bar 138 to move laterally therebetween.

Figure 15:
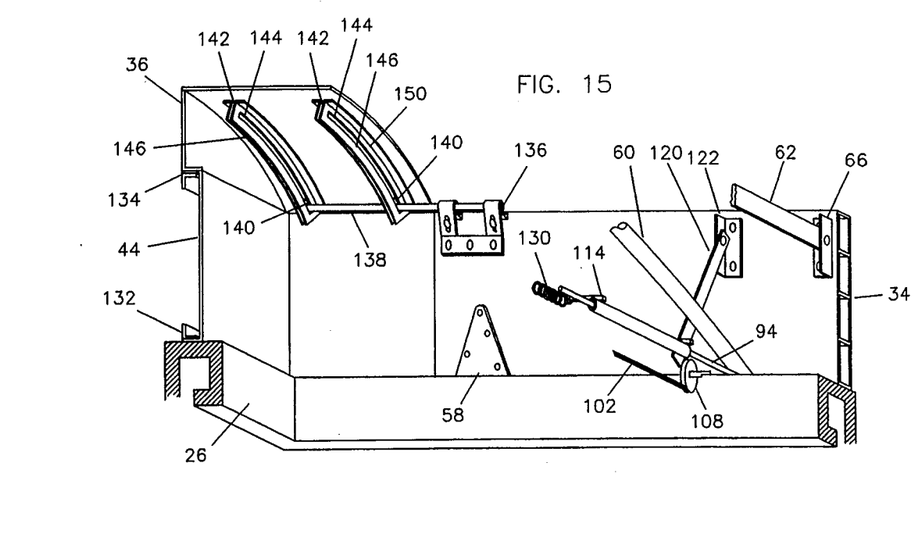
FIG. 15 is a from-below view of the corner of the extension assembly of FIG. 14 in the operationally raised position.

As illustrated in FIGS. 15 and 17, the end-caps 36 are raised into operational position. The flexible tarpaulin member 44 is stretched into a taut condition with uniform horizontal and vertical tension throughout. The taut tarpaulin member 44 is vertically extended. The tarpaulin member 44 is adjacent the vertically positioned extension members 34.

As shown in FIG. 16, the guide rod 46 extends through a vertically oriented guide sleeve 48 which is mounted to the exterior sidewall 24, preferably near where the sidewall 24 is joined with the endwall 26. The guide sleeve 48 is fastened to the sidewall 24 by self-tapping bolts which extend through an attached guide sleeve plate 152 which is positioned near the end of the guide sleeve 48. The upper end of the guide rod 46 is mounted to the end-caps 36 with carriage bolts that extend through a guide rod plate 154, which is attached to the upper end of the guide rod 46.

In the raised position, as illustrated in FIG. 17, the lower vertical end of the guide rod 46 remains extended within the guide sleeve 48. The guide rod 46 and guide sleeve 48 combination, like the double roller-track combination, is preferably positioned at each corner of the cargo box 22.

Figure 18:
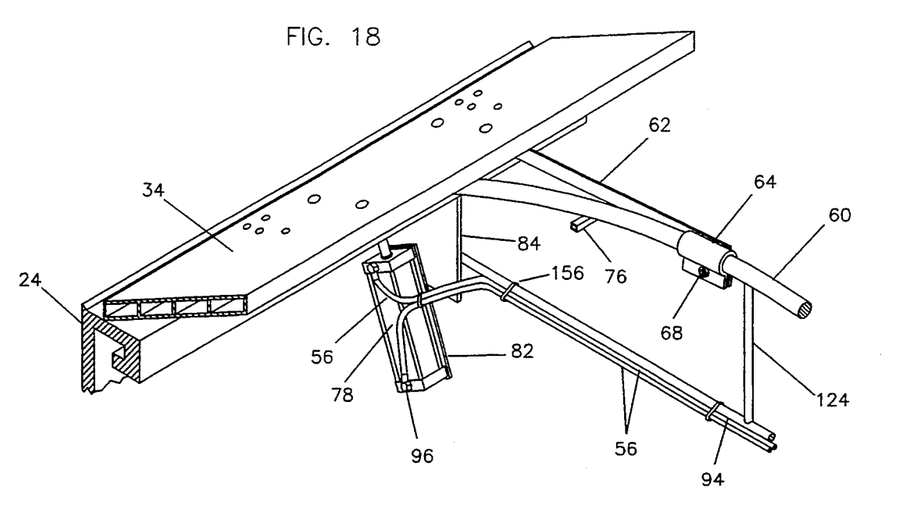
FIG. 18 is a partial view of an alternative embodiment of the extension assembly in its lowered position.
Figure 19:
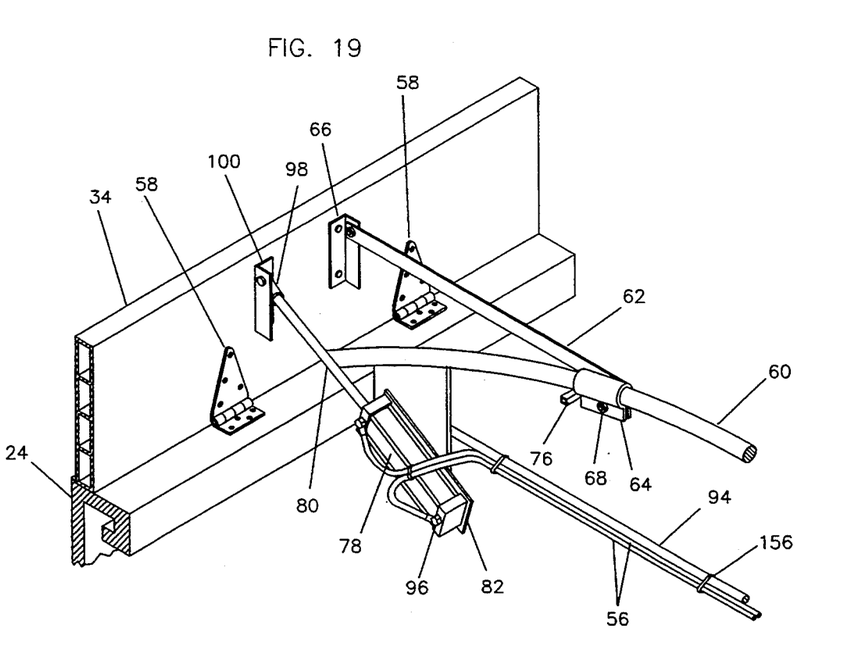
FIG. 19 is a partial view of an alternative embodiment of the extension assembly in its raised position.

Alternatively, in a second embodiment illustrated in FIGS. 18 and 19, the extension assembly 20 may utilize a plurality of pneumatic actuators 78 (one shown for illustration) positioned proximate each of the opposed sidewalls 24. The actuators 78 are preferably positioned at the opposing lateral ends of the truss support structure 60, 94. Each actuator 78 is pivotally secured in similar fashion to that previously described herein.

The actuators 78 are interconnected by the air lines 56 which laterally transverse the cargo box 22. The air lines 56 extend along the lower support truss 94 and are fastened thereto by horizontally spaced-apart tie fasteners 156.

Operations and Use

In FIGS. 1, 2, 6, 9, 14 and 16, the extension assembly 20 is shown in the retracted or lowered position. The extension members 34 pivot about horizontal axes extending parallel to the sidewalls 24. The extension members 34 pivot by means of attached hinges 58 which are horizontally spaced-apart and mounted to the sidewalls 24 near the top 30. The hinges 58 act not only to facilitate pivotal motion, but also secure the extension members 34 to the sidewalls 24.

In order to pivotally raise the extension members, the operator maneuvers the actuator valve handle 54, see FIGS. 2 and 4. The actuator valve handle 54 controls the actuator valve 52 which regulates air flow to the actuators 78. As illustrated in FIGS. 7 and 12, pressurized air flows through the air lines 56 toward the hydraulic fitting 96 located on the actuator 78. The air flow in either line 56 is directionally opposed at any time during the operation.

As shown in FIGS. 6, 7 and 12, the extensible ram 80 is rapidly forced out of the actuator 78 by an internal piston. As the ram 80 pushes toward the extension member 34, the extension member 34 pivots about the axes until it is vertically aligned with the sidewall 24 of the cargo box 22. The actuator 78 swivels about the fixed base plate 84 to accommodate the pivoting motion of the extension member 34. The clevis 98 pivots about the ram bracket 100 mounted on the interior wall of the extension member 34.

The ram bracket 100 is mounted to extend upright in order to vertically equalize the force exerted by the ram 80 on the extension member 34. This method of mounting the horizontally spaced-apart ram brackets 80 ensures a uniform application of force to the extension member 34 during operation and use. Each of the brackets 66, 100, 122 are affixed to the extension members 34 for serving this purpose.

The plurality of pivotally connected support braces 62 swivel in a vertical plane normal to the sidewall 24 during operation and provide support for the extension members 34 during use. As illustrated in FIGS. 7, 10, 12 and 13, the collar 64 to which the support brace 62 is pivotally connected slides along the bowed truss 60 toward the nearest sidewall 24. The tubing 76 affixed to the underside of the bowed truss 60 functions as a stopper for the sliding collar 64 at a position which corresponds to the extension member 34 being vertically aligned with the sidewall 24. The collars 64 will remain in constant contact with the tubing 76 during use of the extension assembly. The contact is maintained by the engaged actuators 78 and also by the outward pressure applied by a load against the extension members 34.

The plurality of support braces 62 are in uniform tension to easily contain a load during use. The extension members 34 are held in a vertical position and are prevented from overextending away from the interior of the cargo box 22. The extension members 34 are provided with sufficient lateral support from the support braces 62 which rely on the original cargo box 22 lateral trusses 60, 94.

In the preferred embodiment, as shown in FIGS. 6–8, the cable 102 loop is attached to the pivotal connection between the clevis 98 and the ram bracket 100. During operation, the attached cable 102 travels an equal distance as does the extended ram 80. The cable 102 slides partially around the bushing 92 which separates the actuator 78 and the attached swivel plate 82. Further, the cable 102 transverses the cargo box 22 while remaining parallel to the lower support truss 94.

Figure 13:
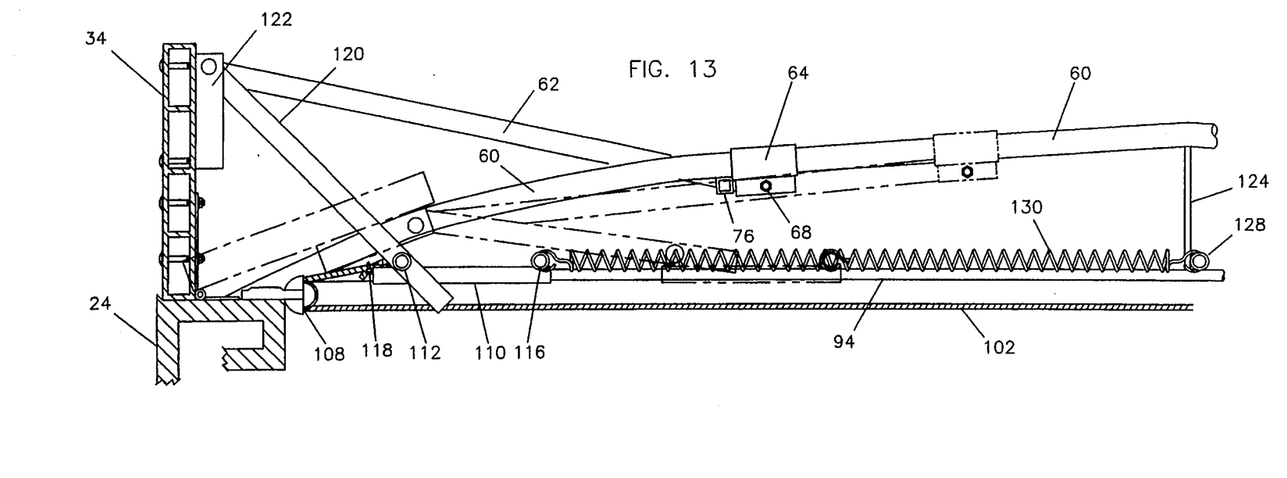
FIG. 13 is a sectional view taken along line 13—13 of FIG. 5.

As illustrated in FIGS. 9, 10, and 13, the cable 102 extends through the pulley 108 which is mounted to the sidewall 24. The upper cable 102 portion travels in the reverse direction from the lower cable 102 portion. The looped-end of the upper cable 102 portion is attached to the pivotal connection between the lifting arm 120 and the push sleeve 110. As shown in FIG. 9, the lowered extension member 34 rests against the upper surface of the bowed truss 60. The relaxed return spring 130 is slightly stretched to interconnect the push sleeve 110 to the vertical member 124. The cable 102 is in a state of low tension when the extension members 34 are in the lowered position.

As illustrated in FIG. 10, the extension member 34 is in the operationally raised position. As the actuator 78 is engaged and the ram 80 is extended, a lower cable 102 portion travels the same direction and distance as the extensible ram 80. As the lower cable 102 portion moves through the pulley 108, an upper cable 102 portion pulls the push sleeve 110 toward the nearest sidewall 24.

The push sleeve 110 slides along the lower support truss 94. As the sliding push sleeve 110 pushes the lower end of the lifting arm 120 toward the sidewall 24, the upper end of the lifting arm 120 pivotally pushes the extension member 34 to a raised position. The lifting arm 120 extends laterally diagonal to the sidewall 24 and is pivotally connected to the upper end of the lifting arm bracket 122 which is mounted to the extension member 34. It will be appreciated that the dimensions of the mechanism should be adjusted so that the lifting arm 120 will translate the maximum force which is transferred by the transverse cable 102 when lifting the extension member 34.

The return spring 130 laterally expands into a high-tension state as the push sleeve 110 slides toward the sidewall 24. During the lowering operation, the spring 130 acts to retract the extension member 34 back into the lowered position. The expanded spring 130 should possess enough contractive force to retract the pivoting extension member 34 without significantly hampering the raising operation.

Preferably, a hinge 58 is mounted proximate to the brace bracket 66 to avoid twisting of the extension member 34 during pivotal lifting. The lateral support brace 62 mechanism operates identically to the mechanism attached to the opposing lateral end of the bowed truss 60 and provides the same high-strength, lateral support function.

As illustrated in FIGS. 14 and 16, the extension assembly 20 is in the lowered position and the end-caps 36 rest atop the endwalls 26 of the cargo box 22. The pair of wheels 140 are positioned in the track 142 portions located nearest the center of the cargo box 22. As the extension member 34 is pivotally lifted during operation, the wheels 140 contact the lower surface of the end-caps 36 and will proceed to roll within the confines of the tracks 142.

Further, the wheels 140 roll along the flat surface of the lower channel 146 to force down the end-caps 36 during the lowering process. However, the wheels 140 do not contact the lower channel 146 during lifting. In the rolling process, the dual wheels 140 will lift the end-caps 36 into the raised position by rolling towards the nearest sidewall 24, see FIGS. 15 and 17. The wheels 140 apply equal vertical force to ensure stable and simultaneous lifting of the end-caps 36. Further, vertical walls of the tracks 142 provide stability for the end-caps 36 while in the operationally raised position.

As shown in FIGS. 15 and 17, the flexible tarpaulin member 44 is pulled into a taut condition as a result of the lifting action. The tarpaulin member 44 is in taut condition when the wheels 140 occupy the maximum lateral position within the tracks 142. This maximum lateral position is generally accomplished when the wheels 140 are positioned vertically above the sidewalls 24. The tarpaulin member 44 maintains uniform tension throughout while in the raised position and is constructed of flexible material sturdy enough to properly withstand the pressure applied by loaded commodities during use. In addition, the guide rod 46 provides stability to the elevated end-caps 36 during the lifting and lowering process by vertically sliding within the guide sleeve 48.

In the second embodiment, as shown in FIGS. 18 and 19, the extension members 34 are pivotally lifted by a plurality of actuators 78 positioned along both sidewalls 24. Thus, the cable 102, lifting arm 120, push sleeve 110 and return spring 130 are unnecessary. The actuators 78 operate to pivotally lift and retract the extension members 34 in the same manner as the actuators 78 previously discussed above.

Accordingly, it can be seen in the above described embodiments that the extension assembly 20 is raised to its operational position within seconds by using the actuator control handle 54. The extension members 34 are pivotally raised and lowered by the convenient and efficient use of pneumatic power. The operator does not have to enter the cargo box 22 or spend time and energy preparing the extension assembly 20 for use. Economy of power is achieved by translating the ample pneumatic force through a cable to operate a relatively simple lifting mechanism. In addition, the extension assembly 20 is exceedingly stable and sturdy.

The extension assembly 20 is readily compatible with the roll-up tarpaulin apparatus 38 while lifting and providing support therefor. Use of a preferred material, such as aluminum, to construct the extension assembly 20 will provide an aesthetically pleasing as well as lightweight and durable extension assembly 20.

It is understood that the present invention is capable of numerous combinations and further modifications of the elements described herein for providing an extension assembly 20. For example, the pneumatic actuators may rely on hydraulic or electrical power, and the extension members 34 may be equipped with strips of tarpaulin that are affixed to the lower portions thereof to prevent debris from accumulating around the extension members 34 during operation.

The foregoing descriptions of specific embodiments of the present invention have been presented for purposes of illustration and description. They are not intended to be exhaustive or to limit the invention to the precise forms disclosed and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. An extension assembly for an open-top cargo box, comprising:
   a pair of extension members attached to sidewalls of the cargo box, said extension members having raised and lowered positions;
   an actuator for raising and lowering said extension members; and
   an end-cap which is coupled with said extension members for raising and lowering therewith.

2. The assembly of claim 1, wherein:
   said extension members are generally perpendicular to the sidewalls when in the lowered position; and
   said extension members are generally aligned with the sidewalls when in the raised position.

3. The assembly of claim 1, wherein:
   said actuator is pivotally mounted.

4. The assembly of claim 1, further comprising:
   a plurality of supports for supporting said extension members.

5. The assembly of claim 1, further comprising:
   a roll-up tarpaulin apparatus which is simultaneously raised and lowered with said extension members.

6. The assembly of claim 1, further comprising:
   a transferring assembly which provides communication between said actuator and said extension members for the raising and lowering thereof.

7. The assembly of claim 1, further comprising:
   a lifting assembly for raising and lowering said end-cap with the respective raising and lowering of said extension members.

8. The assembly of claim 1, further comprising:
   a vehicle wherein the cargo box is attached thereto.

9. An extension assembly for an open-top cargo box having generally upstanding sidewalls, comprising:
   first and second members pivotally attached to the sidewalls;
   said extension members having raised and lowered positions;
   a plurality of actuators for raising and lowering said extension members;
   a control for controlling said actuators to raise and lower said extension members;
   a pair of end-caps coupled with said extension members for raising and lowering therewith;
   a roll-up tarpaulin apparatus for covering the open-top cargo box; and
   wherein said extension members, end-caps and tarpaulin apparatus are raised and lowered by said actuators.

10. The assembly of claim 9, further comprising:
    a plurality of transferring assemblies which provide communication between said actuators and said extension members for the raising and lowering thereof.

11. The assembly of claim 9, further comprising:
    a vehicle wherein the cargo box is attached thereto.

12. The assembly of claim 1, wherein:
    said extension members are pivotally attached to the sidewalls of the cargo box.

13. An extension assembly for an open-top cargo box, comprising:
    a pair of extension members attached to sidewalls of the cargo box, said extension members having raised and lowered positions;
    said extension members are generally perpendicular to the sidewalls when in the lowered position;
    said extension members are generally aligned with the sidewalls when in the raised position;
    an actuator for raising and lowering said extension members; and
    a roll-up tarpaulin apparatus which is raised and lowered with said extension members.

14. The assembly of claim 13, wherein:
    said actuator is pivotally mounted.

15. The assembly of claim 13, further comprising:
    a plurality of supports for supporting said extension members.

16. The assembly of claim 13, further comprising:
    a pair of end-caps which are coupled with said extension members for raising and lowering therewith.

17. The assembly of claim 16, further comprising:
    a lifting assembly for raising and lowering said end-caps with the respective raising and lowering of said extension members.

18. The assembly of claim 13, further comprising:
    a transferring assembly which provides communication between said actuator and said extension members for the raising and lowering thereof.

19. The assembly of claim 13, further comprising:
    a vehicle wherein the cargo box is attached thereto.

20. The assembly of claim 13, further comprising:
    an end-cap coupled with said extension members for raising and lowering therewith.

* * * * *